(12) United States Patent
Nash et al.

(10) Patent No.: US 10,868,758 B1
(45) Date of Patent: Dec. 15, 2020

(54) ENABLING BYPASS FLOWS FOR NETWORK TRAFFIC BETWEEN DEVICES

(71) Applicant: Amazon Technologies, Inc., Seattle, WA (US)

(72) Inventors: Brett Steven Nash, Sammamish, WA (US); Andrew Bruce Dickinson, Seattle, WA (US); Rajagopal Subramaniyan, Woodinville, WA (US); Avik Kumar Saha, Renton, WA (US); Todd Freed, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 16/137,388

(22) Filed: Sep. 20, 2018

(51) Int. Cl.
| | | |
|---|---|---|
| *G06F 15/16* | (2006.01) | |
| *H04L 12/721* | (2013.01) | |
| *H04L 29/06* | (2006.01) | |
| *H04L 12/813* | (2013.01) | |
| *G06F 9/455* | (2018.01) | |

(52) U.S. Cl.
CPC .............. *H04L 45/38* (2013.01); *H04L 47/20* (2013.01); *H04L 67/42* (2013.01); *H04L 69/22* (2013.01); *G06F 9/455* (2013.01)

(58) Field of Classification Search
CPC ......... H04L 45/38; H04L 47/20; H04L 67/42; H04L 69/22

USPC .................................. 709/202–203, 227–228
See application file for complete search history.

(56) References Cited

U.S. PATENT DOCUMENTS

| | | | |
|---|---|---|---|
| 5,636,371 A * | 6/1997 | Yu | H04L 69/161 |
| | | | 709/227 |
| 6,687,732 B1 | 2/2004 | Bector et al. | |
| 6,845,387 B1 * | 1/2005 | Prestas | H04L 67/14 |
| | | | 709/203 |
| 8,547,835 B2 | 10/2013 | Haddad et al. | |
| 9,509,616 B1 * | 11/2016 | Judge | H04L 47/125 |
| 9,880,870 B1 * | 1/2018 | Danilov | G06F 9/45558 |
| 2011/0004698 A1 * | 1/2011 | Wu | H04L 67/327 |
| | | | 709/235 |
| 2013/0064096 A1 * | 3/2013 | Degioanni | H04L 67/1097 |
| | | | 370/241 |
| 2018/0176252 A1 * | 6/2018 | Nimmagadda | H04L 45/306 |
| 2018/0375748 A1 * | 12/2018 | Russell | H04L 43/08 |

* cited by examiner

*Primary Examiner* — Bharat Barot
(74) *Attorney, Agent, or Firm* — Robert C. Kowert; Kowert, Hood, Munyon, Rankin & Goetzel, P.C.

(57) ABSTRACT

Bypass flow may be enabled for network traffic between devices. A source device may include a flow identifier in an outbound packet that is sent to a destination device. An inbound packed sent from the destination device may include information that describes a network path between the source device and the destination device. Subsequent outbound packets bound for the destination device may be rewritten based on the information describing the network path to bypass one or more network devices in the network path.

20 Claims, 10 Drawing Sheets

ENABLING BYPASS FLOWS FOR NETWORK TRAFFIC BETWEEN DEVICES

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies rely upon different types of networking devices and networking features in order to manage network traffic amongst virtualized resources that are accessible over a network. Introducing networking devices and networking features, however, is not without cost. Therefore, techniques that reduce the performance costs of networking devices and networking features while retaining the network management benefits such networking devices and features provide are highly desirable.

Figure 1A:
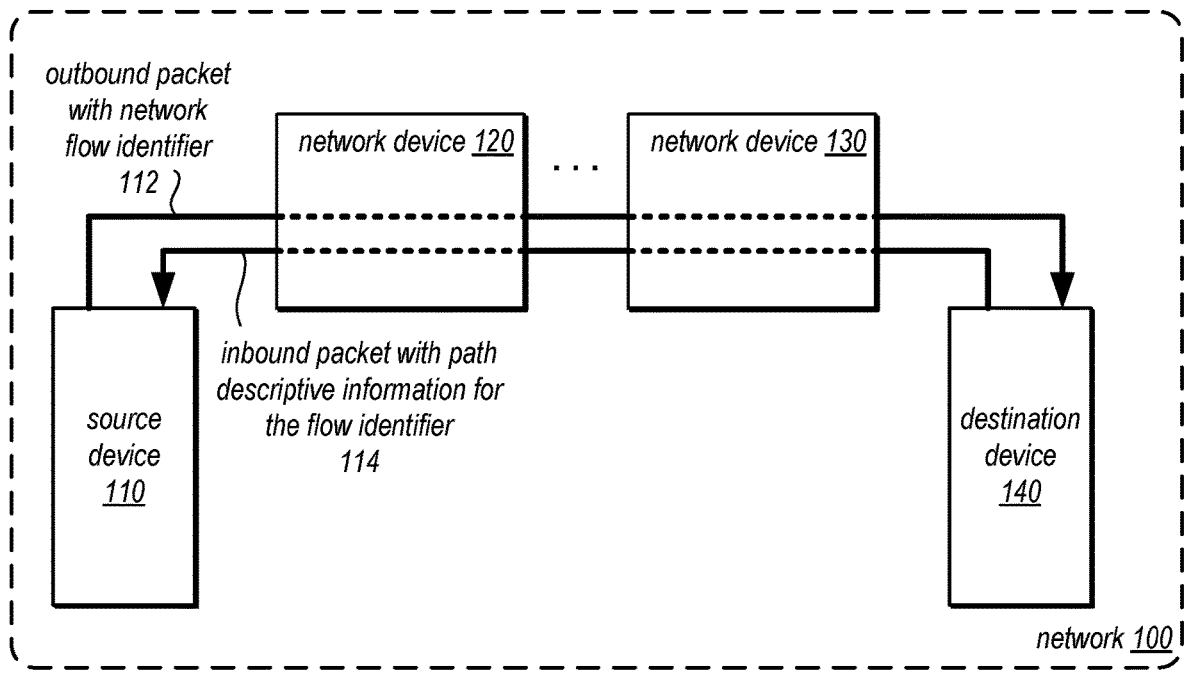
FIGS. 1A-1B are logical block diagrams illustrating enabling bypass flows for network traffic between devices, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement enabling bypass flows for network traffic between devices, according to some embodiments. Networking devices offer many different features to shape, direct, configure, or otherwise manage network traffic between communicating devices. Load balancers, for instance, may route traffic from different clients to different backend servers in order to prevent any one backend server from being overloaded and thus delivering poor performance. Network firewalls, in another example, may filter or limit communications that can be made between devices in order to offer additional security to systems protected by the firewall. These and other networking devices therefore provide many performance benefits to a network that implements networking devices as part of managing traffic among different devices in the network.

Networking devices also incur some performance costs. Each additional networking device that interacts with network traffic between a source and destination device can add latency, increasing the time traffic spends traveling from a source to destination. Additionally networking devices can easily become overburdened when the volume of network traffic is high, adding further performance costs. Enabling bypass flows for network traffic between devices can transition traffic flows away from networking devices once the benefits of those networking devices have been obtained. For example, once a load balancer has selected a backend server for a client device, the load balancer no longer adds any value when receiving subsequent network traffic and forwarding it to the selected backend. Enabling a bypass flow after the load balancer has selected the backend server can reduce the number of network hops between the client device and backend server and can reduce the burden on the load balancer while retaining the benefit of utilizing load balancing to make the selection of the backend server initially. Similar performance benefits can be gained for other networking features offered by networking devices that are between a client or source device and a server or destination device.

FIG. 1A illustrates a network path between a source and destination device that can benefit from enabling a bypass flow, in some embodiments. Source device 110 may be a client of destination device 140 and may send network traffic to utilize the capabilities of destination device 140 to perform various operations at source device 110. A network path between source device 110 and destination device 140 may include one or multiple networking devices, such as network devices 120 and 130. For example, network device 120 may be a load balancer and network device 130 may be a firewall. Initially, when establishing a connection the networking decisions and features made or implemented by network devices 120 and 130 may need to be performed (e.g., selecting destination device 140 and ensuring that the traffic from source device 110 is allowed to reach destination device 140).

To enable a bypass flow to bypass network devices 120 and 130, an outbound packet 112 with a network flow identifier may be sent from source device 110 via network devices 120 and 130 to destination device 140. Network device 120 and 130 may propagate the flow identifier so that other path information (e.g., final destination address for destination device 140, overlay network information, etc.) can be associated with and included in an inbound packet 114. In various embodiments, network devices 120 and 130 and destination device 140 can assent to enable a bypass flow by including the path information and decline to participate by not including the path information, as discussed in detail below.

Figure 1B:
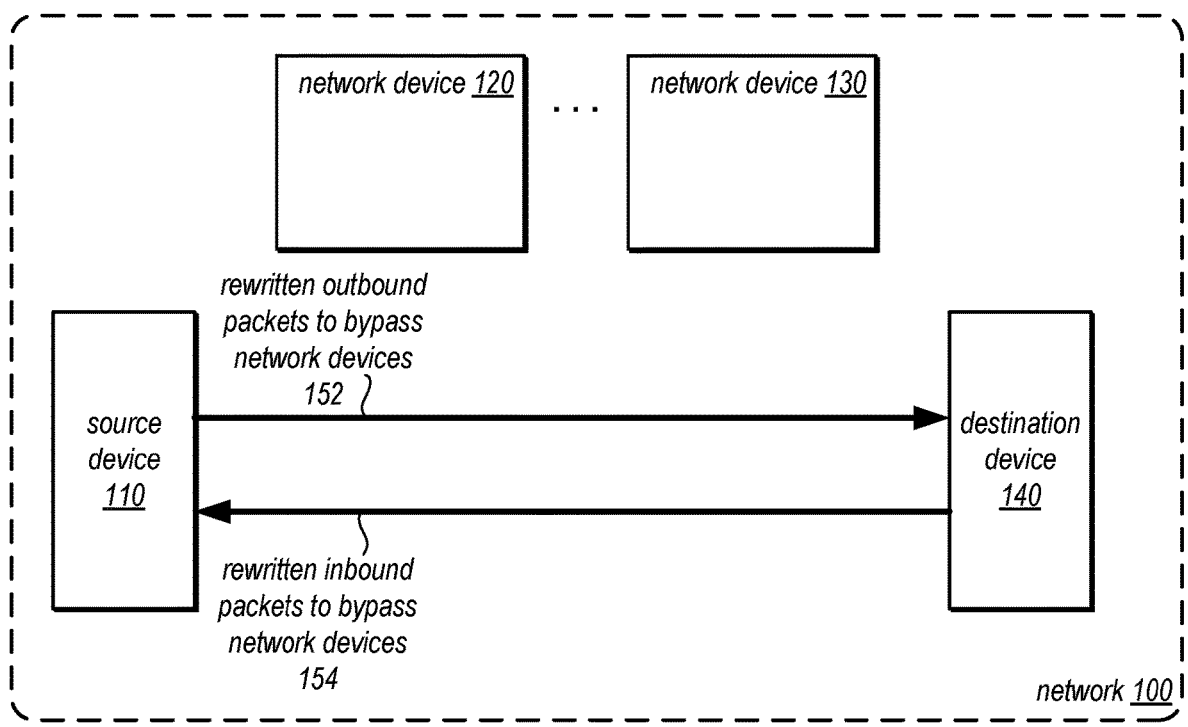

FIG. 1B illustrates a bypass flow, according to some embodiments. Using the path descriptive information received at 114, source device 110 may rewrite outbound packets 152 to bypass network device 120 and 130. The rewritten packets can be sent along a different network path that excludes these network devices and instead may reach destination device 140 faster. Similarly, destination device 140 may send rewritten inbound packets 154 to bypass networking devices 120 and 130 in the other direction. In some embodiments, packets may be rewritten after generation by an application (or instance as discussed below in FIG. 4) so that the bypass flow is transparent to the applications that are instigating the network packets.

Please note that previous descriptions are not intended to be limiting, but are merely provided as logical example of enabling bypass flows for network traffic between devices.

This specification next includes a general description of a provider network, which may implement enabling bypass flows for network traffic between devices. Then various examples of a provider network are discussed, including different components/modules, or arrangements of components/module that may be employed as part of the provider network. A number of different methods and techniques to implement enabling bypass flows for network traffic between devices are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
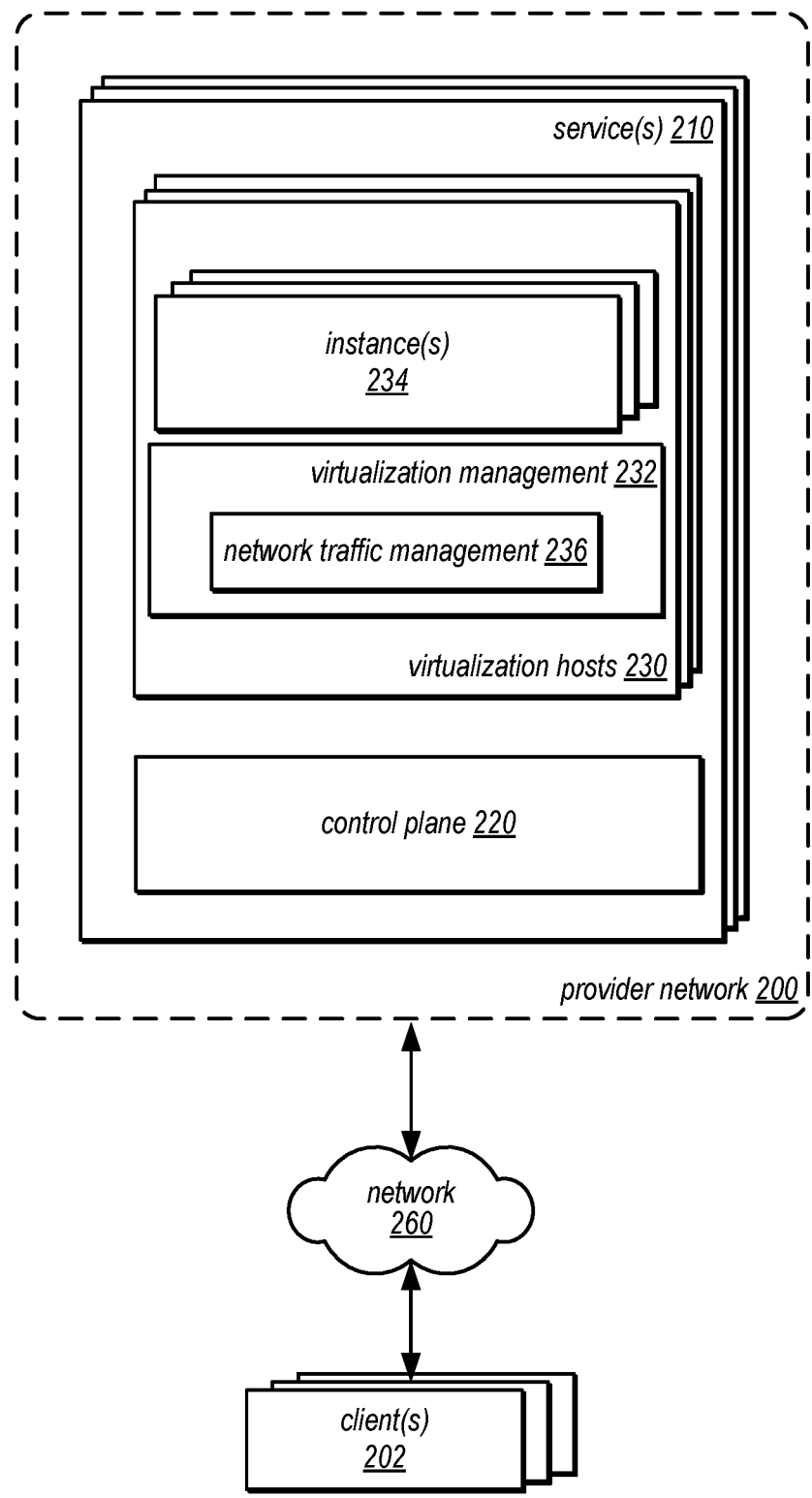
FIG. 2 is a logical block diagram illustrating a provider network that provides virtual compute instances for which bypass flows for network traffic between virtual compute instances may be enabled, according to some embodiments.

FIG. 2 is a logical block diagram illustrating a provider network that provides virtual compute instances for which bypass flows for network traffic between virtual compute instances may be enabled, according to some embodiments. Provider network 200 may be set up by an entity such as a company or a public sector organization to provide one or more services 210 (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services 210 offered by the provider network 200. In some embodiments, provider network 200 may provide computing resources. These computing resources may in some embodiments be offered to clients in units called "instances," 234 such as virtual compute instances.

In various embodiments, provider network 200 may implement a control plane 220 for services 210 in order to manage the computing resource offerings provided to clients 202 by provider network 200. Control plane 220 may implement various different components to manage the computing resource offerings. Control plane 220 may be implemented across a variety of servers, nodes, or other computing systems or devices (such as computing system 1000 described below with regard to FIG. 10). It is noted that where one or more instances of a given component may exist, reference to that component herein may be made in either the singular or the plural. However, usage of either form is not intended to preclude the other.

In at least some embodiments, control plane 220 may implement an interface. The interface may process incoming requests received via network 260 and direct them to the appropriate component for further processing. In at least some embodiments, the interface may be a network-based interface and may be implemented as a graphical interface (e.g., as part of an administration control panel or web site), command line interface, and/or as a programmatic interface (e.g., handling various Application Programming Interface (API) commands). In various embodiments, the interface may be implemented as part of a front end module or component dispatching requests to the various other components, such as resource management (e.g., for updating or modifying currently running computing resources), reservation management (e.g., for starting, stopping, or otherwise provisioning computing resources), resource monitoring (e.g., for viewing performance and status of information of computing resources), and billing (e.g., for determining resource usage). Clients 202, in various embodiments, may not directly provision, launch or configure resources but may send requests to control plane 210 such that the illustrated components (or other components, functions or services not illustrated) may perform the requested actions.

Control plane 220 may manage the access to, capacity of, mappings to, and other control or direction of computing resources offered by provider network. In at least some embodiments, control plane 220 may provide both a direct sell and $3^{rd}$ party resell market for capacity reservations (e.g., reserved compute instances). For example, control plane 220 may allow clients 202 via an interface to learn about, select, purchase access to, and/or reserve capacity for computing resources, either from an initial sale marketplace or a resale marketplace, via a web page or via an API. Control plane 220 may also offer and/or implement a flexible set of resource reservation, control and access interfaces for clients 202. For example control plane 220 may provide credentials or permissions to clients 202 such that compute instance control operations/interactions between clients and in-use computing resources may be performed.

In various embodiments, control plane 220 may track the consumption of various computing resources, consumed for different virtual computer resources, clients, user accounts, and/or specific resources. In at least some embodiments, control plane 220 may implement various administrative actions to stop, heal, manage, or otherwise respond to various different scenarios in the fleet of virtualization hosts 230 and instances 234. Control plane 220 may also provide access to various metric data for client(s) 202 as well as manage client configured alarms.

A virtual compute instance 234 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 234 of service(s) 210 in different embodiments, including general purpose or special purpose computer servers, storage devices, network devices and the like. In some embodiments instance clients 202 or other any other user may be configured (and/or authorized) to direct network traffic to a compute instance 234.

Compute instances 234 may operate or implement a variety of different platforms, such as application server instances, general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access an instance 234.

Figure 4:
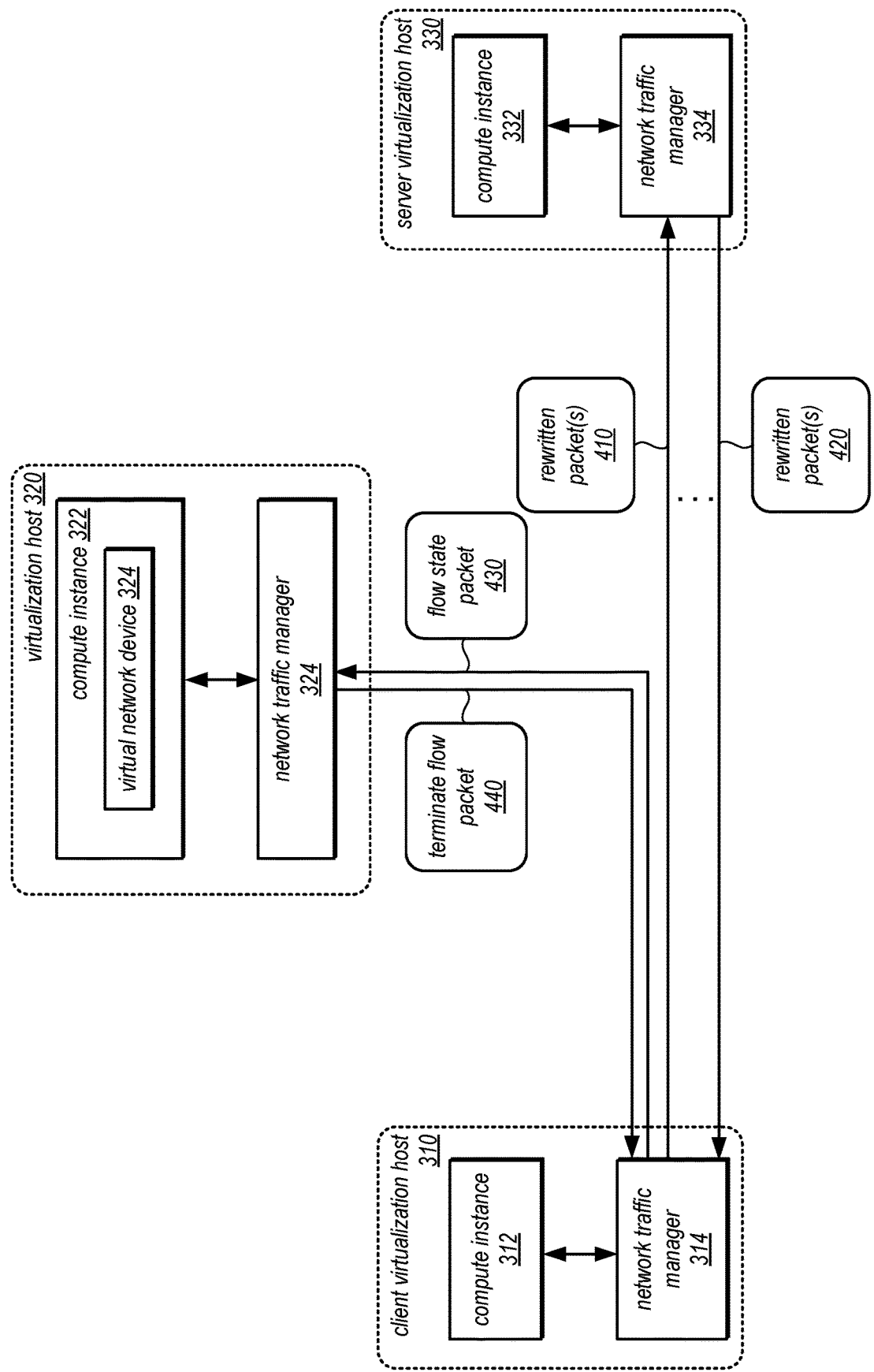
FIG. 4 is a logical block diagram illustrating rewritten packets of a bypass flow generated from information that describes a network path, according to some embodiments.

As illustrated in FIG. 2, a virtualization host 230 may implement and/or manage multiple compute instances 234, in some embodiments, and may be implemented on one or more computing devices, such as computing system 1000 described below with regard to FIG. 4. A virtualization host 230 may include a virtualization management application 232, capable of instantiating and managing a number of different client-accessible virtual machines or compute instances 234. The virtualization management application 232 may include, for example, a hypervisor and an administrative instance of an operating system, which may be termed a "domain-zero" or "dom0" operating system in some implementations. The dom0 operating system may not be accessible by clients on whose behalf the compute instances 234 run, but may instead be responsible for various administrative or control-plane operations of the network provider, including handling the network traffic directed to or from the compute instances 234.

Client(s) 202 may encompass any type of client that can submit requests to provider network 200. For example, a given client 202 may include a suitable version of a web browser, or may include a plug-in module or other type of code module configured to execute as an extension to or within an execution environment provided by a web browser. Alternatively, a client 202 may encompass an application such as a dashboard application (or user interface thereof), a media application, an office application or any other application that may make use of compute instances 234 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 234 in a manner that is transparent to applications implement on the client 202 utilizing computational resources provided by the compute instance 234.

Clients 202 may convey network-based services requests to network-based virtual computing service 200 via network 260. In various embodiments, network 260 may encompass any suitable combination of networking hardware and protocols necessary to establish network-based communications between clients 202 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 202 and service(s) 210 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with provider network 200 using a private network rather than the public Internet.

In various embodiments, tasks, operations, or other work performed by a service may be distributed among multiple other resources hosted a different virtualization hosts for the same or different service(s) 210. For example, data storage services may be store data objects to be evaluated, transformed, and loaded into a different storage location, service, or format such that an ETL service may use, and thus send network traffic to virtualization hosts to get data, among other requests, in order to perform ETL work on the data. Therefore, a variety of scenarios can arise in a provider network, such as provider network 200, where traffic that takes on a client-server relationship is performed. Enabling bypass flows between virtualization hosts can offer many performance improvements to services as the communication between service hosts can gain a significant performance increase when a bypass flow is enabled.

Figure 3:
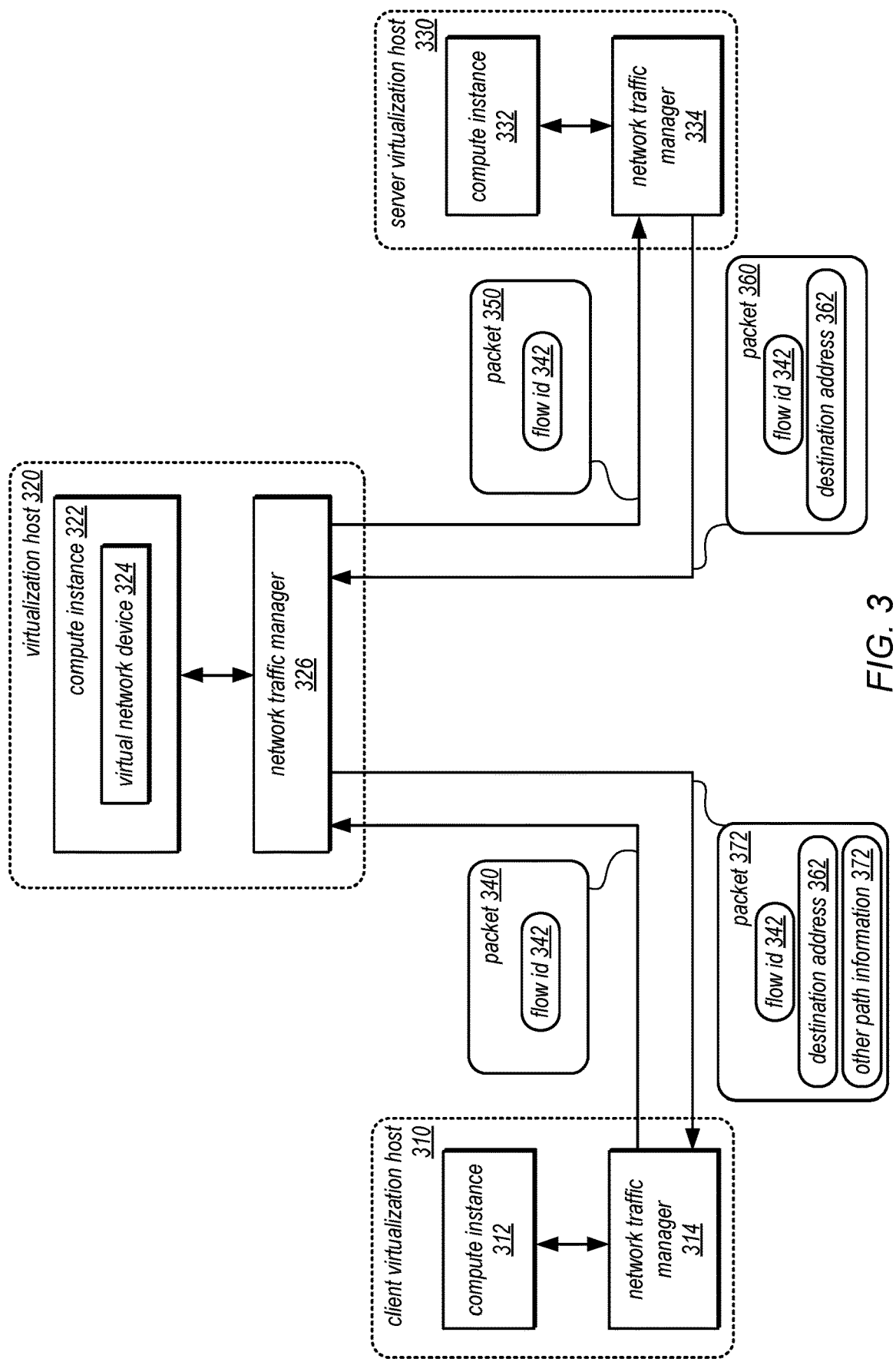
FIG. 3 is a logical block diagram illustrating collecting information that describes a network path to enable a bypass flow, according to some embodiments.

To enable a bypass flow for a connection, information and assent to the bypass flow may be collected from network devices and the destination device of the connection. FIG. 3 is a logical block diagram illustrating collecting information that describes a network path to enable a bypass flow, according to some embodiments. Client virtualization host 310 (e.g., similar to virtualization hosts in FIG. 2) may host a compute instance 312 that is a client of a compute instance 332 implemented at server virtualization host 330. In order to enable a bypass flow between compute instance 312 and compute instance 332, network traffic manager 314 may modify or otherwise rewrite a packet generated by compute instance 312, packet 340, to include a flow id 342. The flow id 342 may be propagated amongst the networking devices and server virtualization host 330 in order to associate the information that describes the network path with the flow id. In this way, the descriptive information can then be used to enable the bypass flow with the appropriate connection as many different traffic flows between many different clients and servers may be ongoing within a provider network, including multiple different connections or flows from client virtualization host 310 and server virtualization host 330 that are in addition to those illustrated in FIG. 3.

In the illustrated example, packet 340 is sent to virtualization host 320 which hosts compute instance 322 implementing a virtual network device 324 (e.g., a virtual load balancer, firewall, or other networking device feature(s)). Network traffic manager 326, may send on packet 350 to server virtualization host 330 and propagate flow id 342 in packet 342. By propagating flow id 342, network traffic manager 326 is assenting to the bypass flow, in some embodiments, as the flow id may trigger the inclusion of path information to enable the bypass flow at network traffic manager 334. In scenarios where network traffic manager 326 does not assent to enabling a bypass flow (e.g., when some networking decisions remain unmade at virtual network device 324), network traffic manager 326 may forward traffic without including the flow identifier. When (if ever) network traffic manager 326 finds a bypass flow to be desirable, then it may forward a packet from client virtualization host 310 to server virtualization host 330 and include flow id 342.

Figure 7:
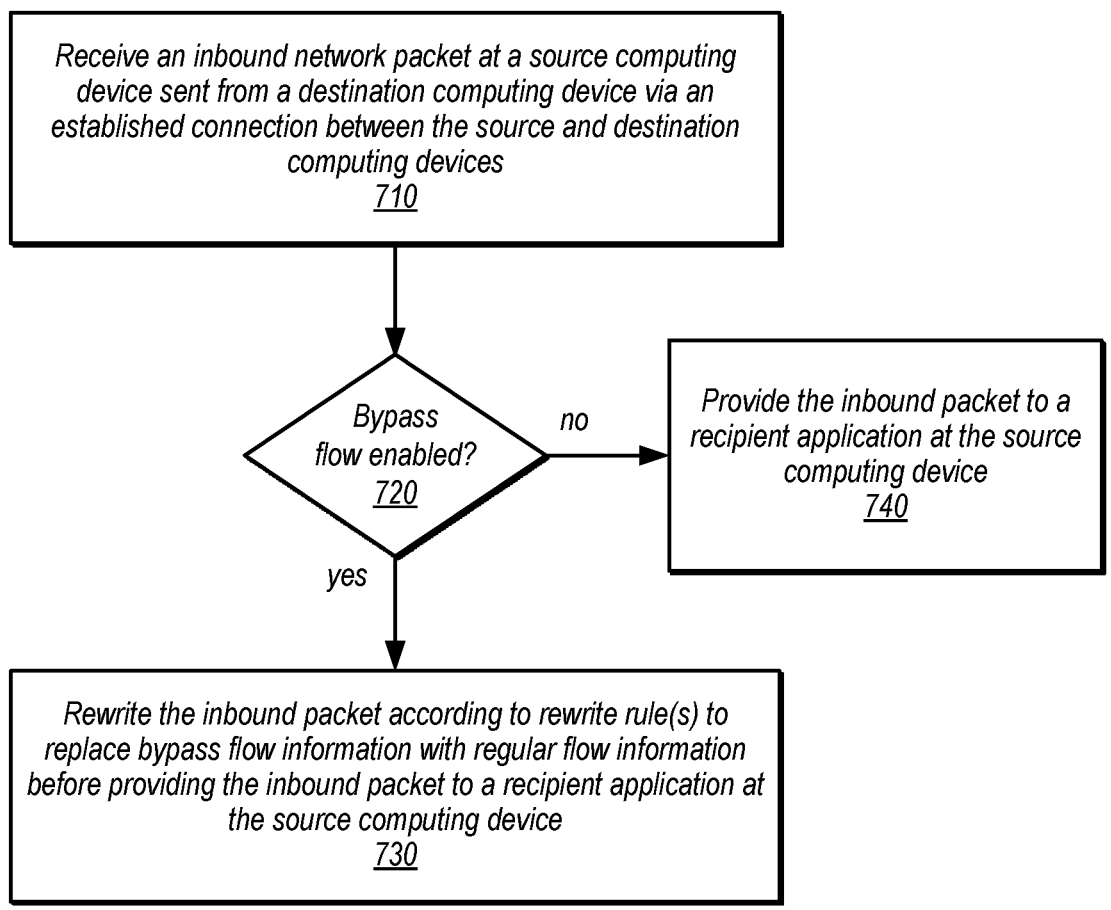
FIG. 7 is a high-level flowchart illustrating various methods and techniques for rewriting inbound network packets at source computing device for an enabled bypass flow, according to some embodiments.

As discussed in FIG. 7 below, network traffic manager 334 may determine whether to ignore or respond to the flow id 342 in a subsequent packet. If network traffic manager 334 ignores the flow id, then bypass flow may not be enabled until network traffic manager 334 agrees to enable bypass flow by including the flow id 342 in a responsive packet, such as packet 360. Thus, network traffic manager 334 can delay the enablement of a bypass flow (as network traffic manager 314 may send other packets with flow id until assent is received or the bypass flow attempt is terminated (e.g., by a terminate instruction in FIG. 4)), in some embodiments. Packet 360 illustrates an assent to enable bypass flow by network traffic manager 334. Packet 360 includes a destination address 362 (or multiple destination addresses in scenarios where overlay networks are involved in routing traffic between client and server) which network traffic manager 314 may use as a destination address in future packets instead of the destination address that routes packets to virtualization host 320. Network traffic manager 326 may add other path information 372 in packet 372 in addition to propagating the flow id 342 and destination address 362. In this way, state information for the connection between client virtualization host 310 and server virtualization host 330 that would otherwise be maintained at virtual networking device 324 can be shifted to network traffic manager 314. Other path information may include information that describes an overlay network (e.g., overlay source and destination addresses to reach compute instance 332), offset information for transmission control protocol (TCP) or other sequencing, or other information, such as a flow domain identifier, that identifies the connection within a larger set of connections handled by virtual network device 324 (e.g., which may be implemented as part of a service that has a fleet of virtual network devices to perform similar networking features so that the combination of a flow domain identifier and flow identifier can uniquely identify a connection between a client and server host).

Once the path information (e.g. flow id 342, destination address 362, and other path information 372) is received, a bypass flow can be enabled (if network traffic manager 314 chooses to enable the bypass flow, as discussed below with regard to FIGS. 5 and 6. FIG. 4 is a logical block diagram illustrating rewritten packets of a bypass flow generated from information that describes a network path, according to some embodiments. Network traffic manager 314 may rewrite packets 410 so that virtualization host 320 does not receive the packet (e.g., by changing the destination address which would have otherwise directed the packet to virtualization host 320 to use the network address for server virtualization host 330, which may include using as the destination address the substrate network address for server virtualization host 330 in the substrate destination address field and the overlay network address as the destination address for the overlay network destination address field).

Network traffic manager 334 may also send rewritten packets 420 to avoid virtualization host 320 using similar rewrite rules. The bypass phase may continue until either network traffic manager 314 or 334 ends the bypass flow, the connection is ended, or if instructed to end the bypass flow by management packet, such as terminate flow packet 440. For example, virtual network device 324 may still be responsible for the connection between client virtualization host 310 and server virtualization host 330 and thus may receive flow state information packets 430 from network traffic manager 314 (as illustrated in FIG. 4 or network traffic manager 334 (not illustrated)).

Flow state packet 430 may serve as a keep alive indication to virtual network device 324, that the connection is still active and that the bypass flow should be retained, in some embodiments. In some embodiments, flow state packet 430 may combine state information for all enabled bypass flows from client virtualization host 310 (e.g., to multiple different other virtualization hosts). Flow state packet 430 may be sent responsive to a periodic or aperiodic/random reporting event, in some embodiments.

Figure 5:
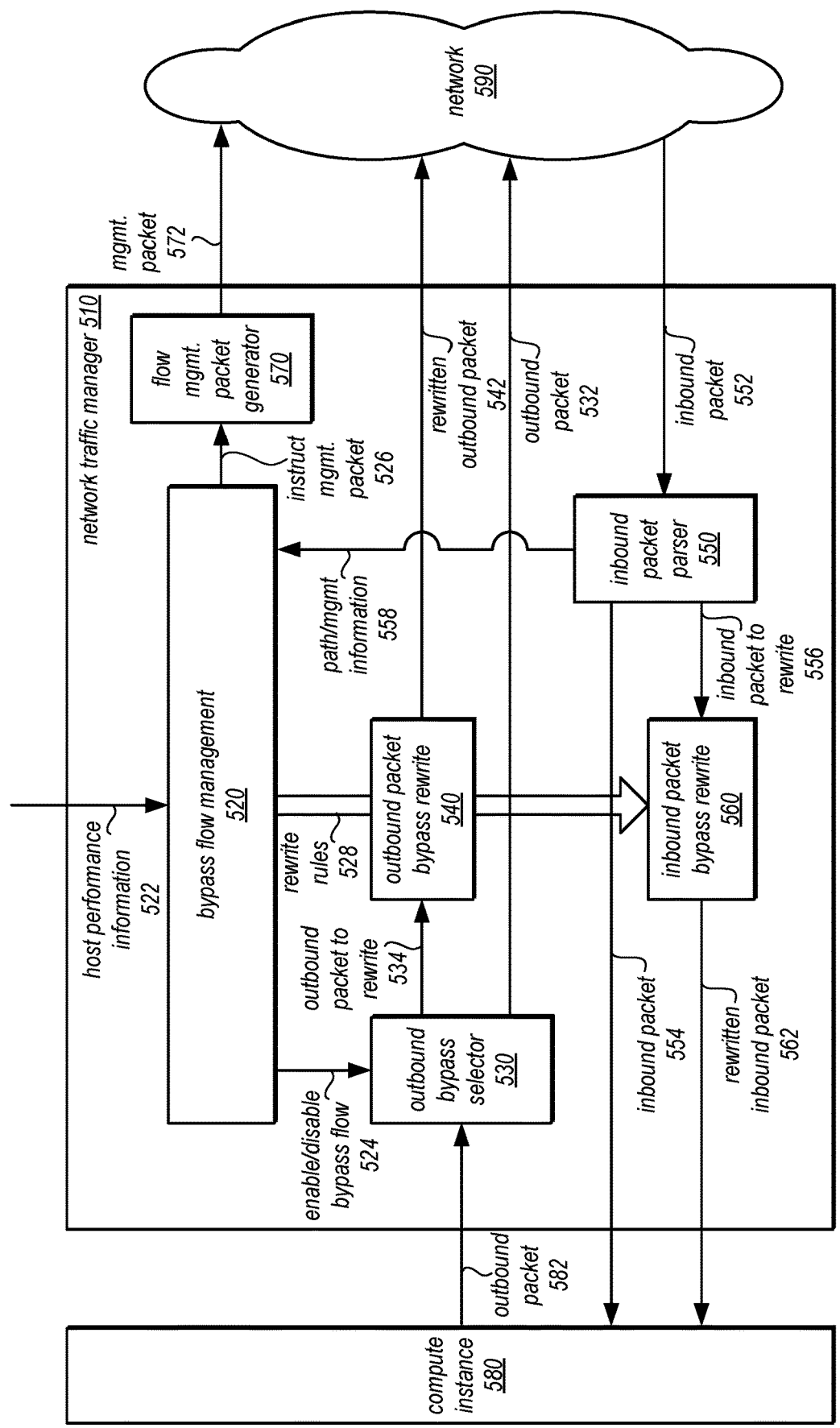
FIG. 5 is a logical block diagram illustrating a network traffic manager that enables or disables a bypass flow, according to some embodiments.
Figure 6:
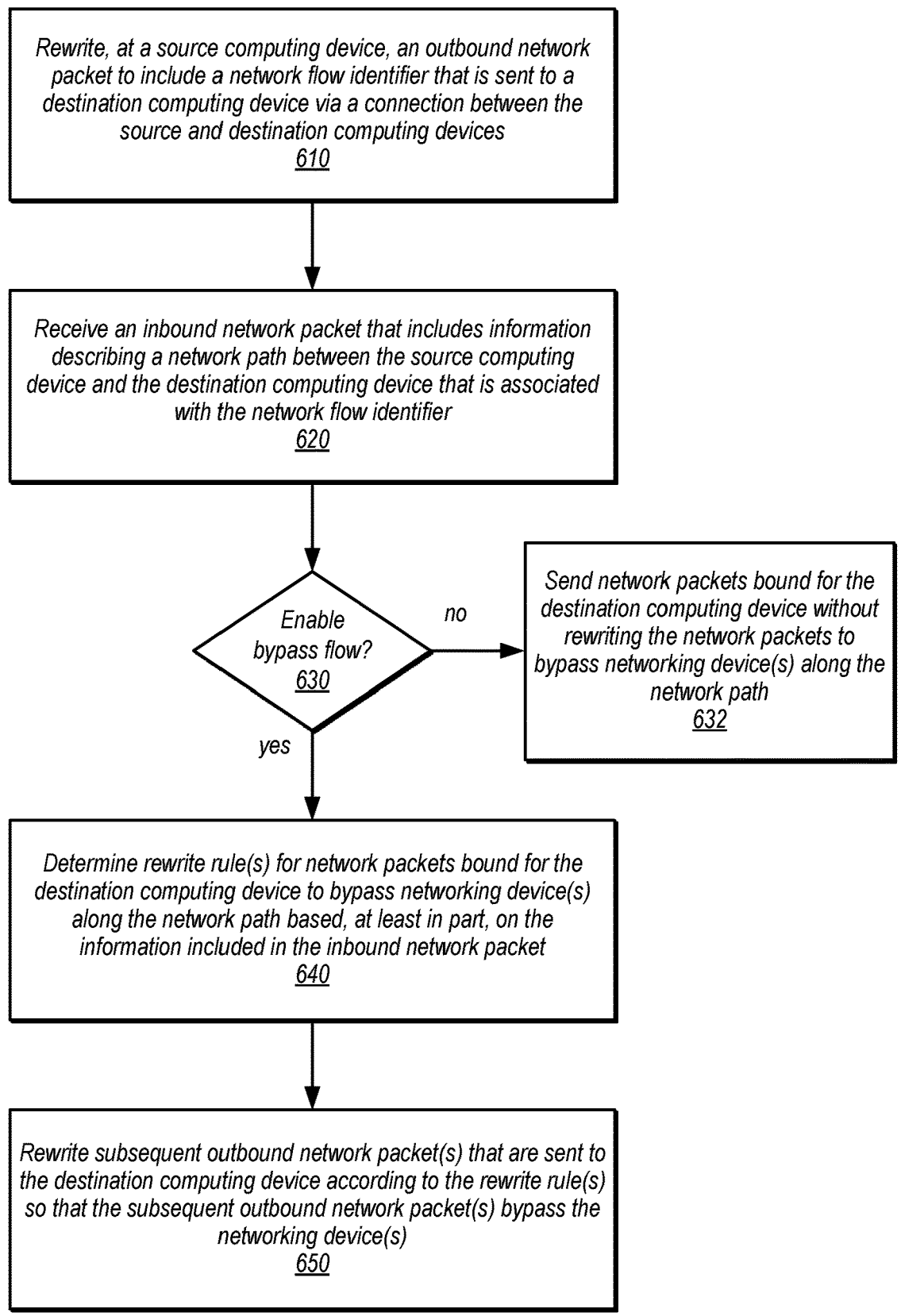
FIG. 6 is a high-level flowchart illustrating various methods and techniques for enabling bypass flows for network traffic between devices, according to some embodiments.

FIG. 5 is a logical block diagram illustrating a network traffic manager that enables or disables a bypass flow, according to some embodiments. Network traffic manager 510 may be implemented as part of clients, servers, and/or networking devices, as discussed above with regard to FIGS. 3 and 4. Network traffic manager 510 may implement bypass management flow 520 to enable and disable bypass flows. Bypass flow management 520 may track the state of bypass flows (e.g., possible bypass flows for valid connections, allocated bypass flows that have been assigned a network flow identifier but not yet enabled, enabled bypass flows, failed bypass flows (e.g., as a result of networking device or a destination device failing to agree to enable bypass or the source device deciding not to enable), or terminated bypass flows (e.g., from a terminate management packet or by terminating at the source device). Bypass flow management 520 may assign a network flow identifier to a connection and may reuse network flow identifiers if, for instance, a bypass flow is refused for a connection, in some embodiments.

Bypass flow management 520 may detect which connections are eligible for a bypass flow, in some embodiments. For example, bypass flow management 520 may evaluate whether a connection includes traversing a network path with a networking device that can be bypassed (e.g., whether a destination address points to a logical or physical device, where a physical device may not be able to be bypassed, but a logical device could be bypassed). For eligible connections, bypass flow management 520 may indicate to enable bypass flow 524 at outbound bypass selector 530 to send an outbound packet 582 from compute instance 580 to be rewritten 534 at outbound packet bypass rewrite 540 to include a network flow identifier before being sent as a rewritten packet 542 via network 590.

Bypass flow management 520 may receive path information from an inbound packet 552 via inbound packet parser 550 to be able to enable a bypass flow. Bypass flow management 520 may determine whether to enable the bypass flow using information to evaluate criteria for enabling a bypass flow. For example, bypass flow management 520 may receive host performance information 522 (e.g., memory, CPU, network, I/O bandwidth, or other resource utilization information) to evaluate with respect to bypass flow enable criteria. Additionally, host performance information 522 may be used to terminate an existing bypass flow by evaluating the information to see if termination criteria for the flow (e.g., memory utilization exceeding a threshold) is satisfied.

For enabled bypass flows, bypass flow management 520 can determine rewrite rules 528 (e.g., according to the techniques discussed below with regard to FIGS. 6-9, so that outbound packet bypass rewrite 540 and inbound packet bypass rewrite 560 can modify network packets. Outbound bypass selector 530 may also be updated according to enablement/disablement indications 524 to choose whether to rewrite an outbound packet 582 via outbound packet bypass rewrite 540 or send the outbound packet 532 without rewrite (e.g., no bypass flow enabled, no flow identifier to be included, bypass flow terminated, etc.).

Inbound packet parser 550 may be able to detect enabled bypass flow packets according to a token or identifier, such as a network flow identifier, included in the inbound packet 552. For those inbound packets 554 that are not part of an enabled bypass flow, inbound packet parser may provide them 554 to compute instance 582 without a bypass rewrite. For those inbound packets 552 that are in an enabled flow, inbound packet parser 550 may send 556 the packets to inbound packet bypass rewrite 560 which may apply the rewrite rules 528 from bypass flow management to provide rewritten inbound packet 562 to compute instance. Other types of inbound packets, such as management packets to request bypass flow status (or instruct a termination of a bypass flow) may be recognized by inbound packet parser 550 and provided 558 as part of path/management information to bypass flow management 520.

Bypass flow management 520 may also instruct 526 the generation of management packets at flow management packet generator 570. Flow management packet generator 570 may send liveness, health, performance or other flow management information as a management packet 572 (e.g., which may be sent to a control plane or networking device as illustrated in FIG. 4).

The examples of implementing enabling bypass flows for network traffic between discussed above with regard to FIGS. 2 through 5 have been given in regard to virtual computing resources hosted in a provider network. Various other types of computing devices (which may not be virtual resource hosts) may implement these techniques, and which may or may not be offered as part of a provider network service. Private networks, for instance, that utilize networking devices to offer different network functions (e.g., load balancing, security, etc.) may take advantage of techniques to enable a bypass flow between devices in the private network and reduce the load on intervening network devices (e.g., reduce load on internal load balancers). FIG. 6 is a high-level flowchart illustrating various methods and techniques for enabling bypass flows for network traffic between devices, according to some embodiments. These techniques may be implemented using various components of the provider network as described above with regard to FIGS. 2-5 or other computing devices.

As indicated at 610, an outbound network packet may be rewritten at a source computing device to include a flow identifier that is sent to a destination computing device via a connection between the source and destination computing devices, in some embodiments. For instance, different computing devices may connect according to various protocols, or other techniques, in order to communicate to perform different tasks together. A connection may be established when initialization actions, handshakes, token/credential exchanges, or other operations and interactions between the source and destination computing devices are complete. In at least some embodiments, a rewrite of an outbound network packet may not be performed until a determination is made that sending traffic to the destination computing device includes networking devices in a network path between the computing devices can be bypassed. Some networking devices, various switches, routers, or other devices that relay packets between computing devices that are not directly wired may not be bypassable, while other networking devices, such as devices that perform load balancing, network security, or other network traffic management features may be bypassed (e.g., in the event that the features do not need to be performed for each network packet sent between the source and destination computing devices).

The network flow identifier may be chosen by the source computing device (or may be assigned by another system or component, such as a networking device which may also have input into whether a bypass flow is enabled), in some embodiments. A list of existing network flow identifiers may be maintained (e.g., at the source computing device) so that each traffic flow from the source computing device can be uniquely identified. In this way, the state of enabled bypass flows can be tracked according to the network flow identifier, in some embodiments.

The outbound network packet with the included network flow identifier may be sent to the destination computing device. As discussed above at FIG. 3 and below with regard to FIG. 8, networking devices and/or the destination computing device may choose whether to participate or allow a bypass flow (e.g., by ignoring or propagating the network flow identifier so that it reaches the destination computing device), in some embodiments. If it is not ignored, then the destination computing device and networking device(s) in the network path between the source and destination computing devices may include information describing the network path. As indicated at 620, in some embodiments, an inbound network packet that includes information describing the network path between the source computing device and the destination computing device that is associated with the network flow identifier may be received.

The information may be used to enable a bypass flow between the source and destination computing devices. However, as indicated at 630, a source computing device may determine whether to enable a bypass flow, in some embodiments, even though the other devices (e.g., networking devices and destination computing device have agreed to enable bypass routing by providing the information describing the network path). For example, the current workload of network traffic between the source and destination computing device may not achieve sufficient performance saving in bypass flow to justify the additional resources like memory and processor capacity used to store flow information and/or perform packet rewrites. In some embodiments, the type of traffic (e.g., data transfer traffic versus control message traffic) may also be considered when determining whether to enable bypass flow. Memory or other computing resource utilization may limit whether bypass flow can enabled, in some embodiments. Various other criteria may be considered, whether alone or in combination, to determine whether to enable bypass flow and thus the previous examples are not intended to be limiting. For example, criteria may include determining whether a stage in a workflow or process is reached between the source computing device and the destination computing device before allowing bypass flow to be enabled, in some embodiments.

If bypass flow is not enabled, then network packets bound for the destination computing device may be sent to the destination computing device without rewriting the network packets to bypass networking device(s) along the network path, as indicated at 632, in some embodiments. If, however, bypass flow is enabled, then as indicated at 640, rewrite rule(s) for network packets bound for the destination computing device may be determined to bypass one or more networking devices along the network path based, at least in part, on the information included in the inbound network packet, in some embodiments. For example, templates for rewrite rules may generically identify the location of data to update, replace, or remove, but may not identify what the new/modified content of the location in the network packet is to be. Instead, the path information, such as overlay and substrate network address information, may be obtained from the path information to update the template rule. In some embodiments, offset values, or other location information for making a rewrite to an outbound network packet may be determined from the path information. The rewrite rules may be stored or mapped to the modification/new values to be applied by the rules (which may be stored or mapped when the inbound network packet is received that includes the path information), in some embodiments.

Subsequent outbound network packet(s) that are sent to the destination computing device may be rewritten according to the rewrite rule(s) so that the subsequent outbound network packet(s) may bypass the networking devices, as indicated at 650, in some embodiments. For example, as discussed above at FIG. 4, a destination address may be changed in order to change how switches or routers handle the outbound network packet (e.g., by not directing it to the bypassed networking devices according to the changed destination address). The rewritten outbound network packets may then be sent to the destination computing device.

Once a bypass flow for a source computing device is enabled and performed outbound network packets, at some point inbound network packets sent using the bypass flow may be received. In order to ensure that the bypass flow is transparent to an application that uses the network traffic, rewrite rules for inbound packets may also be applied. FIG. 7 is a high-level flowchart illustrating various methods and techniques for rewriting inbound network packets at source computing device for an enabled bypass flow, according to some embodiments.

As indicated at 710, an inbound network packet at a source computing device sent from a destination computing device via an established connection between the source and destination computing devices may be received, in some embodiments. As indicated at 720, a determination may be made as to whether bypass flow is enabled for the inbound network packet, in some embodiments. For example, a list, table, or other data structure may record enabled bypass flows for the source computing device to track bypass flows enabled with various other computing devices. A network flow identifier or other information in the network packet may be used to determine whether the bypass flow is enabled for the destination computing device (e.g., by looking for an entry in the list).

If bypass flow is not enabled for the inbound network packet, then as indicated at 740, the inbound network packet may be provided to a recipient application at the source computing device, in some embodiments. For example, a recipient application could be a virtualized machine, operating system, process, task, instance (as discussed above with regard to FIGS. 2-5), or other resource hosted or operating at the source computing device. If, however, bypass flow is enabled for the inbound network packet, then as indicated at 730, the inbound network packet may be rewritten according to one or more rewrite rule(s) to replace bypass flow information with regular flow information before providing the inbound packet to a recipient application at the source computing device, in some embodiments. For instance, bypass flow information may include one or more network addresses in the source or destination fields, which may correspond to the information of the destination computing device instead of one of the networking devices (or information that would route a packet from the networking device). Thus, a rewrite could replace the information of the destination computing device with that which would be supplied by the networking device if that networking device were not bypassed, in some embodiments.

Figure 8:
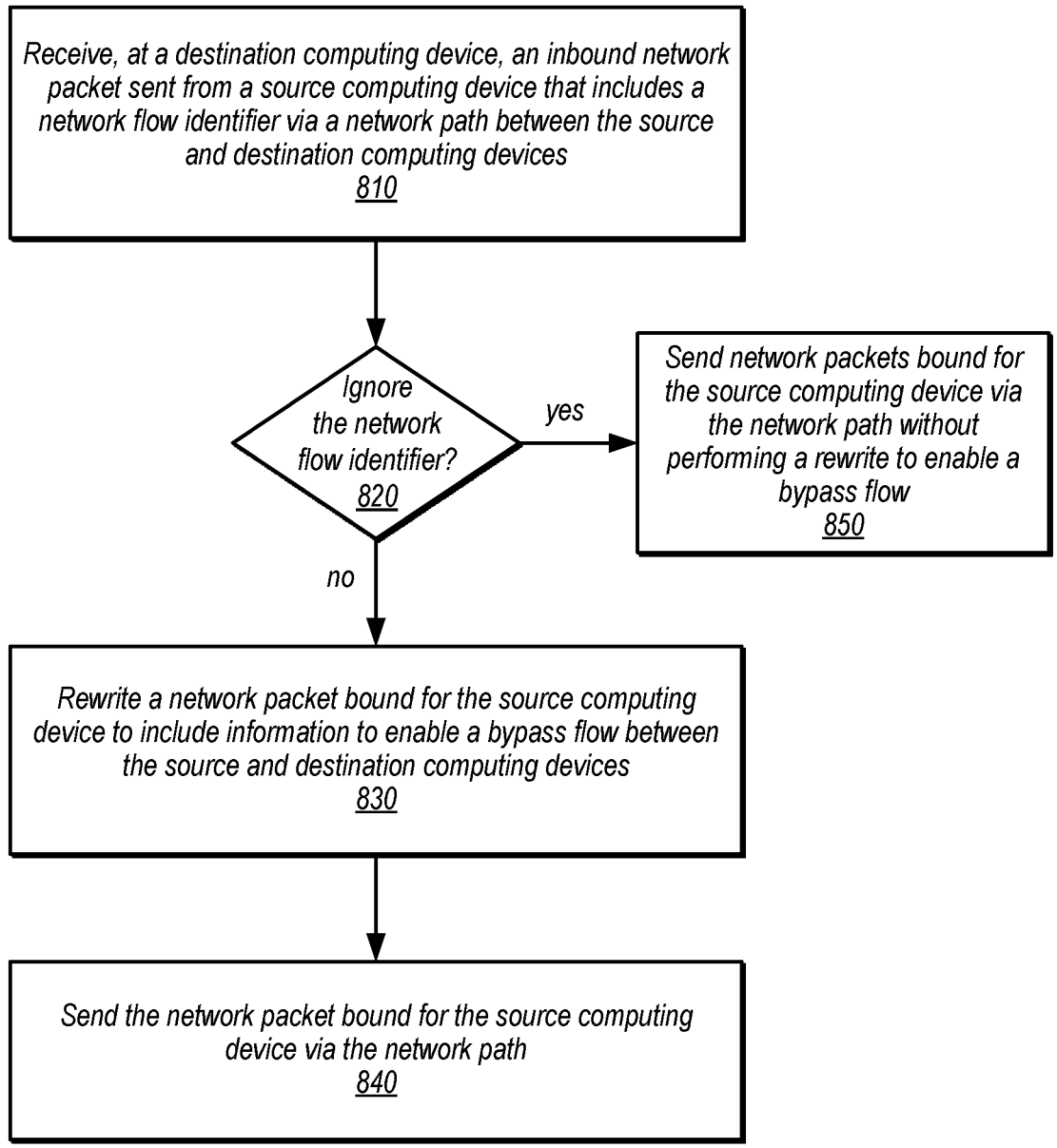
FIG. 8 is a high-level flowchart illustrating various methods and techniques for accepting or ignoring a network flow identifier to collect information that describes a network path to enable a bypass flow, according to some embodiments.

FIG. 8 is a high-level flowchart illustrating various methods and techniques for accepting or ignoring a network flow identifier to collect information that describes a network path to enable a bypass flow, according to some embodiments. As indicated at 810, an inbound network packet may be received at a destination computing device that is sent from a source computing device that includes a network flow identifier via a network path between the source and destination computing devices. The flow identifier may be compared, in some embodiments, with a list, table, or other data structure that records bypass flows at the destination computing devices in order to determine if that network flow identifier has been used for a currently active bypass flow. If so, then the inbound network packet may be dropped (not illustrated), in some embodiments.

As indicated at 820, a determination may be made as to whether to ignore the network identifier, in some embodiments. Ignoring the network flow identifier may prevent a bypass flow between the source and destination computing devices as information to describe the network path in order to bypass networking devices may not be included in responsive network packets. A decision to ignore the network flow identifier may consider one or multiple criteria. For example, a threshold capacity to handle a bypass flow from the source computing device (e.g., a memory capacity to store tracking information or other capability to handle accelerated or increased traffic because of the bypass flow may be considered alone, or in combination). In some embodiments, criteria may include a limit on the number of bypass flows that can be enabled at the destination computing device.

As indicated by the positive exit from 820, a decision to ignore the network flow identifier may cause network packets bound for the source computing device (from the destination computing device) to be sent back to the source computing device without performing a rewrite to enable a bypass flow, as indicated at 850. Instead, the network packets may be sent using regular flow information so that the network packets do not bypass the networking devices, in some embodiments. A decision to ignore a network flow identifier could be assigned an expiration or time-to-live value, which would allow for a new determination to be made with respect to ignoring the network flow identifier, in some scenarios. In this way, bypass flow can be delayed by the destination computing device until it is optimal (e.g., according to the criteria discussed above) to enable bypass flow with the source computing device. In some embodiments, a decision to ignore the network identifier may be permanent barring consideration of other network packets with the network flow identifier from being rewritten to enable a bypass flow.

If the network flow identifier is determined not to be ignored by the destination computing device, then, as indicated at 830, a network packet bound for the source computing device may be rewritten to include information to enable a bypass flow between the source and destination computing devices, in some embodiments. For example, path descriptive information, including a network address (or multiple addresses) to directly (or exclusive of the bypassed networking devices) reach the destination computing device, may be included in the rewritten packet. The rewrite rules may adjust other information in the network packet (e.g., to indicate to networking devices that the destination computing device has approved of enabling bypass flow with the source computing device), in some embodiments. Then, as indicated at 840, the network packet bound for the source computing device may be sent via the network path. In this way, other path information to enable bypass information may be collected, updated, or otherwise included in the network packet at one (or more) of the networking devices to be bypassed.

Figure 9:
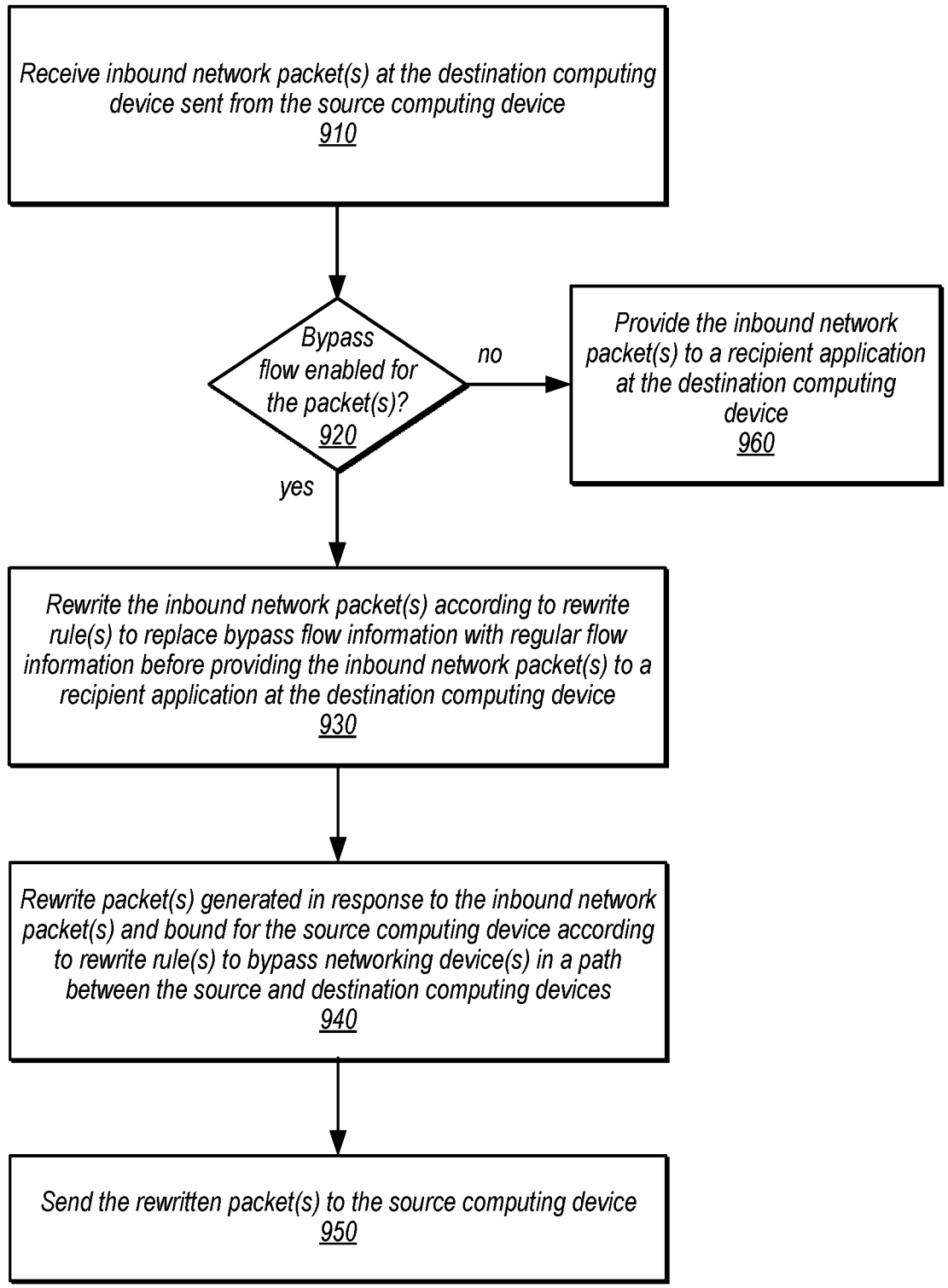
FIG. 9 is a high-level flowchart illustrating various methods and techniques for rewriting inbound network packets of a bypass flow at a destination, according to some embodiments.

FIG. 9 is a high-level flowchart illustrating various methods and techniques for rewriting inbound network packets of a bypass flow at a destination, according to some embodiments. As indicated at 910, inbound network packet(s) may be received at a destination computing device that are sent from the source computing device, in some embodiments. As indicated at 920, a determination may be made as to whether bypass flow is enabled for the packets, in some embodiments. For example, a network flow identifier (which may be included in the inbound network packets) may be compared with a bypass flow list, table, or other data structure that stores accepted bypass flows for connected computing devices. If the network flow identifier matches an entry in the bypass flow list, then it may be determined that bypass flow is enabled for the inbound network packets. Other identifying information, such as a source address, destination address, or other information in the inbound network packets (e.g., connection information or metadata that is included in the network packet related to identifying or sustaining the connection between the source and destination computing devices) may be used to determine whether a recorded bypass flow is associated with the inbound network packets.

If bypass flow is not enabled for the packet(s), then as indicated at 960, the inbound packet may be provided to a recipient application at the destination computing device, in some embodiments. The inbound network packets may not be altered (at least with respect to bypass flow information) when provided. In some embodiments, network packets where bypass flow was previously enabled but is no longer enabled (e.g., an entry in the bypass flow list that corresponds to the inbound network packets) may be dropped or returned with an error indication.

For inbound network packets with bypass flow enabled, the inbound packet(s) may be rewritten according to rewrite rule(s) to replace bypass flow information or otherwise modify the network packet with regular flow information before providing the inbound network packet(s) to a recipient application at the destination computing device, as indicated at 930, in some embodiments. For example, as discussed above with regard to FIG. 7, rewrite rules may replace information included in the inbound network packet(s) to enable the bypass flow (e.g., different address(es) in destination field(s) in a header) with information that would have been present had bypass flow not been enabled (e.g., information that would have been added or included in the inbound network packets by a bypassed networking device).

For example, various overlay or virtualization information that would have been included in the network packet if received without bypass flow may be included. In this way, from the prospective the recipient application, whether bypass flow is enabled or not is transparent to the network packets as they are received at the recipient application.

As indicated at 940, packet(s) generated in response to the inbound network packet(s) and bound for the source computing device may be modified or otherwise rewritten according to rewrite rule(s) to bypass networking device(s) in a path between the source and destination computing address, in some embodiments. For example, as discussed above with regard to FIG. 6, the rewrites to packets may include changing destination address(es) or other information that would otherwise route the packet(s) to the networking devices to be bypassed. Then, as indicated at 950, the rewritten packets may be sent to the source computing device, in various embodiments. As a result of the rewrite, the rewritten packets may travel a different network path than packets that would have been sent to the bypassed networking devices, in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
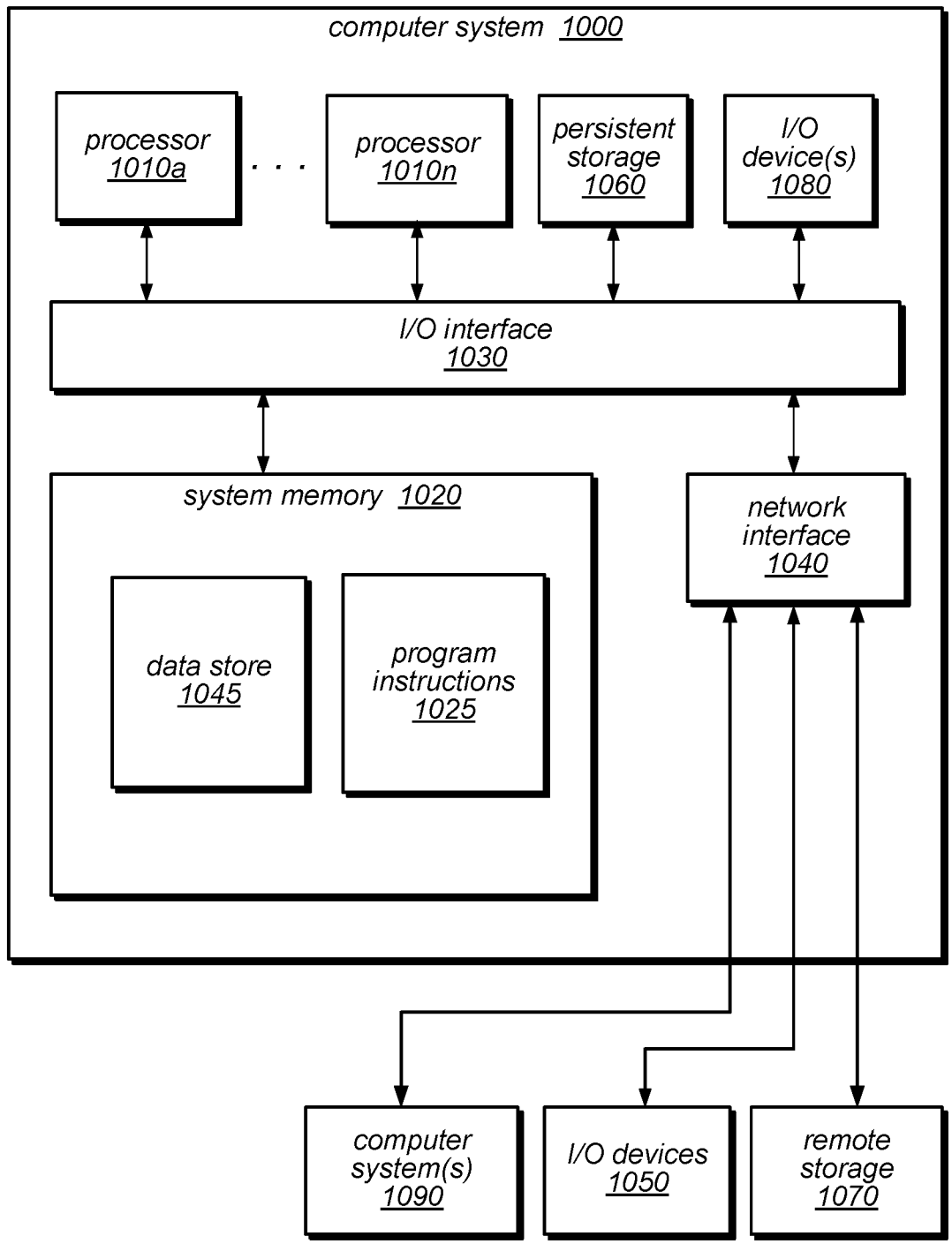
FIG. 10 is a block diagram illustrating an example computing system, according to some embodiments.

Embodiments of enabling bypass flows for network traffic between devices may be implemented on one or more computer systems, which may interact with various other devices. FIG. 10 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network and/or virtualization host, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more components of the distributed system described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a source virtualization host and a destination virtualization host, respectively comprising at least one processor and a memory and respectively hosting one or more virtual compute instances, wherein a network connection is established between the source virtualization host and the destination virtualization host;
   wherein the source virtualization host is configured to:
      rewrite an outbound network packet generated by one of the virtual compute instances hosted at the source virtualization host and bound for one of the virtual compute instances at the destination virtualization host to include a network flow identifier;
      send the rewritten outbound network packet to the destination virtualization host;
      receive an inbound network packet that includes information describing a network path between the source virtualization host and the destination virtualization host that is associated with the network flow identifier;
      determine one or more rewrite rules for network packets bound for the one virtual compute instance at the destination virtualization host to bypass one or more networking devices along the network path based, at least in part, on the information included in the inbound network packet;
      apply the one or more rewrite rules to rewrite a subsequent outbound network packet generated by the one virtual compute instance at the source virtualization host and bound for the one virtual compute instance at the destination virtualization host to bypass the one or more network devices along the network path; and
      send the rewritten subsequent outbound network packet to the destination virtualization host.

2. The system of claim 1, wherein the source virtualization host is further configured to:
   before the determination of the one or more rewrite rules for network packets bound for the one virtual compute instance at the destination virtualization host, determine that a bypass flow for the connection between the source virtualization host and the destination virtualization host should be enabled.

3. The system of claim 1, wherein the destination virtualization host is configured to:
   receive the rewritten outbound network packet that includes the network flow identifier;
   rewrite the inbound network packet to include at least some of the information describing the network path; and
   send the rewritten inbound network packet to the source virtualization host.

4. The system of claim 3, further comprising a virtualization host that hosts a compute instance that implements one of the networking devices, and wherein the virtualization host is configured to:
   add to the rewritten inbound network packet another portion of the information describing the network path before forwarding the rewritten inbound network packet to the source virtualization host.

5. A method, comprising:
   performing by a source computing device with an established network connection to a destination computing device:
      rewriting an outbound network packet that is sent to the destination computing device via the network connection to include a network flow identifier;
      receiving an inbound network packet that includes information describing a network path between the source computing device and the destination computing device that is associated with the network flow identifier;

determining one or more rewrite rules for network packets bound for the destination computing device to bypass one or more networking devices along the network path based, at least in part, on the information included in the inbound network packet;

rewriting one or more subsequent outbound network packets that are sent to the destination computing device according to the one or more rewrite rules so that the one or more subsequent outbound network packets bypass the one or more networking devices.

6. The method of claim 5, further comprising:
before determining the one or more rewrite rules for network packets bound for the destination computing device, determining that a bypass flow for the connection between the source computing client and the destination computing client should be enabled.

7. The method of claim 5, further comprising:
receiving a network packet from one of the one or more networking devices to end the bypass flow for the connection between the source computing device and the destination computing device; and
after receiving the network packet to end the bypass flow, sending further network packets bound to the destination computing device without performing a rewrite to bypass the one or more networking devices.

8. The method of claim 5, further comprising:
performing, by one of the one or more networking devices:
before forwarding the outbound network to the destination computing device, determining that a bypass flow for the connection between the source computing device and the destination computing device should be enabled.

9. The method of claim 5, further comprising:
performing, by the destination computing device:
receiving a network packet sent from the source computing device that includes the network flow identifier before the outbound network packet was sent from the source computing device; and
determining that a bypass flow for the connection between the source computing client and the destination computing client should not be enabled.

10. The method of claim 5, further comprising:
performing, by the destination computing device:
receiving the rewritten outbound network packet that includes the network flow identifier;
rewriting the inbound network packet to include at least some of the information describing the network path; and
sending the rewritten inbound network packet to the source virtualization host.

11. The method of claim 10, further comprising:
performing, by the destination computing device:
before rewriting the inbound network packet to include at least some of the information describing the network path, determining that a bypass flow for the connection between the source computing client and the destination computing client should be enabled.

12. The method of claim 10, further comprising:
performing, by the destination computing device:
rewriting one or more packets generated in response to receiving the one or more subsequent outbound network packets according to one or more rewrite rules to bypass the one or more networking devices; and
sending the rewritten one or more packets to the source computing device.

13. The method of claim 1, wherein the source computing device, the destination computing device and the one or more networking devices are virtualization hosts that host respective compute instances, wherein the respective compute instance of the source computing device generates the outbound network packet and the one or more subsequent outbound network packets, and wherein the respective compute instance of the destination computing device generates the inbound network packet.

14. A non-transitory, computer-readable storage medium, storing program instructions that when executed by one or more computing devices cause the one or more computing devices to implement a client device with an established network connection to a server:
generating an outbound network packet to be sent to the server via the network connection;
rewriting the outbound network packet to include a network flow identifier;
sending the rewritten outbound network packet to the server;
receiving an inbound network packet that includes information describing a network path between the client device and the server that is associated with the network flow identifier;
for one or more subsequent outbound network packets generated by the client to be sent to the server:
applying one or more rewrite rules determined based, at least in part on the information included in the inbound network packet to rewrite the one or more subsequent outbound network packets to bypass one or more network devices along the network path; and
sending the rewritten one or more subsequent outbound network packets to the server.

15. The non-transitory, computer-readable storage medium of claim 14, wherein the program instructions when executed by the one or more computing devices cause the one or more computing devices to further implement:
before applying the one or more rewrite rules to rewrite the one or more subsequent outbound network packets, determining that a bypass flow for the connection between the client and server should be enabled.

16. The non-transitory, computer-readable storage medium of claim 14, wherein the program instructions when executed by the one or more computing devices cause the one or more computing devices to further implement:
receiving a network packet from one of the one or more networking devices to end the bypass flow for the connection between the client device and the server; and
after receiving the network packet to end the bypass flow, sending further network packets bound to the server without performing a rewrite to bypass the one or more networking devices.

17. The non-transitory, computer-readable storage medium of claim 14, wherein the program instructions when executed by the one or more computing devices cause the one or more computing devices to further implement sending a network packet to one of the networking devices indicating a state of the bypass flow for the connection between the client device and the server.

18. The non-transitory, computer-readable storage medium of claim 14, wherein the program instructions when executed by the one or more computing devices cause the one or more computing devices to further implement:

after sending the rewritten one or more subsequent outbound network packets to the server:

receiving a subsequent inbound network packet; and rewriting the subsequent inbound network packet according to one or more rewrite rules to replace bypass flow information in the subsequent inbound network packet with regular flow information before providing the subsequent inbound network packet to a recipient application at the client.

19. The non-transitory, computer-readable storage medium of claim 14, wherein at least one of the one or more networking devices adds to the inbound network packet at least some of the information describing the network path.

20. The non-transitory, computer-readable storage medium of claim 14, wherein the client device and the server are implemented as part of one or more services offered by a provider network.

\* \* \* \* \*